United States Patent

Hilburger et al.

[19]

[11] Patent Number: 6,113,081
[45] Date of Patent: *Sep. 5, 2000

[54] SNAP-ON BUMPER FOR AIR SPRING

[75] Inventors: Mark D. Hilburger; Daniel J. Leonard, both of Carmel; Mohamad Taghizadeh, Indianapolis, all of Ind.

[73] Assignee: Bridgestone/Firestone, Inc., Akron, Ohio

[ * ] Notice: This patent is subject to a terminal disclaimer.

[21] Appl. No.: 09/107,622

[22] Filed: Jun. 30, 1998

[51] Int. Cl.[7] ........................................... F16F 9/04
[52] U.S. Cl. ........................................ 267/64.27; 267/64.24
[58] Field of Search ........................ 267/35, 122, 64.19, 267/64.21, 64.23, 64.24, 64.27, 140.4, 141.2–141.5

[56] References Cited

U.S. PATENT DOCUMENTS

| | | | |
|---|---|---|---|
| 2,988,353 | 6/1961 | Dietrich | 267/65 |
| 3,565,456 | 2/1971 | Zoltok | 280/106.5 |
| 3,658,314 | 4/1972 | Luzsicza | 267/121 |
| 3,957,318 | 5/1976 | Wiebe | 308/138 |
| 4,218,599 | 8/1980 | Garn | 200/159 R |
| 4,342,264 | 8/1982 | Hindin et al. | 105/215 |
| 4,478,396 | 10/1984 | Kawaura | 267/8 R |
| 4,506,910 | 3/1985 | Bierens | 280/711 |
| 4,787,606 | 11/1988 | Geno et al. | 267/64.27 |
| 4,852,861 | 8/1989 | Harris | 267/64.27 |
| 4,946,144 | 8/1990 | Geno et al. | 267/64.27 |
| 5,060,916 | 10/1991 | Koschinat et al. | 267/64.27 |
| 5,201,500 | 4/1993 | Ecktman et al. | 267/140 |
| 5,261,650 | 11/1993 | Hein | 267/220 |
| 5,456,454 | 10/1995 | Schulz et al. | 267/293 |
| 5,467,970 | 11/1995 | Ratu et al. | 267/220 |
| 5,921,532 | 7/1999 | Pierce et al. | 267/64.19 |
| 5,941,510 | 8/1999 | Grass et al. | 267/64.27 |

FOREIGN PATENT DOCUMENTS

| | | |
|---|---|---|
| 1285 792 | 12/1968 | Germany . |
| 298 08 109 | 8/1998 | Germany . |
| 964138 | 7/1964 | United Kingdom . |

*Primary Examiner*—Robert J. Oberleitner
*Assistant Examiner*—Bradley King
*Attorney, Agent, or Firm*—John M. Vasuta; Michael Sand

[57] ABSTRACT

An air spring has a pair of spaced end members for mounting the spring at spaced locations on a structure. A flexible sleeve of elastomeric material is sealingly engaged with the end members and forms a pressurized fluid chamber therebetween. A post is mounted on one of the end members and extends into the fluid chamber. A shock absorbing two-piece bumper includes a rigid base which is formed with an axial opening and is seated upon one of the end members with the post extending into the opening. An elastomeric member is mounted within the axial opening of the rigid base member and is snap-fitted onto the post. The upper end of the elastomeric member extends outwardly over the upper end of the base to engage the opposite end member upon the air spring failing or experiencing a large deflection. The two-piece bumper provides a high load carrying capability with low deflection and replaces the heretofore used single member elastomeric bumper.

17 Claims, 3 Drawing Sheets

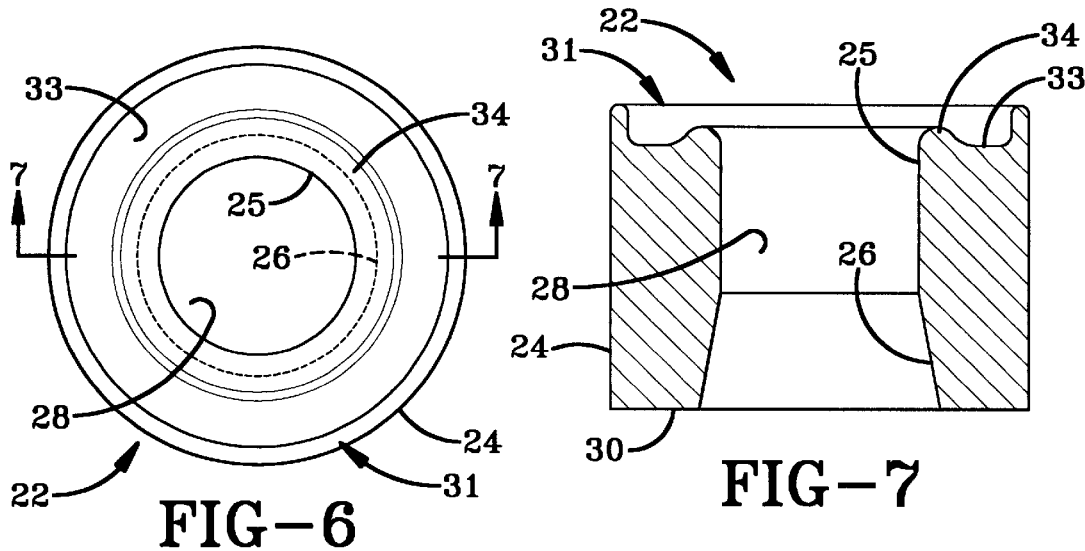
FIG-6
FIG-7
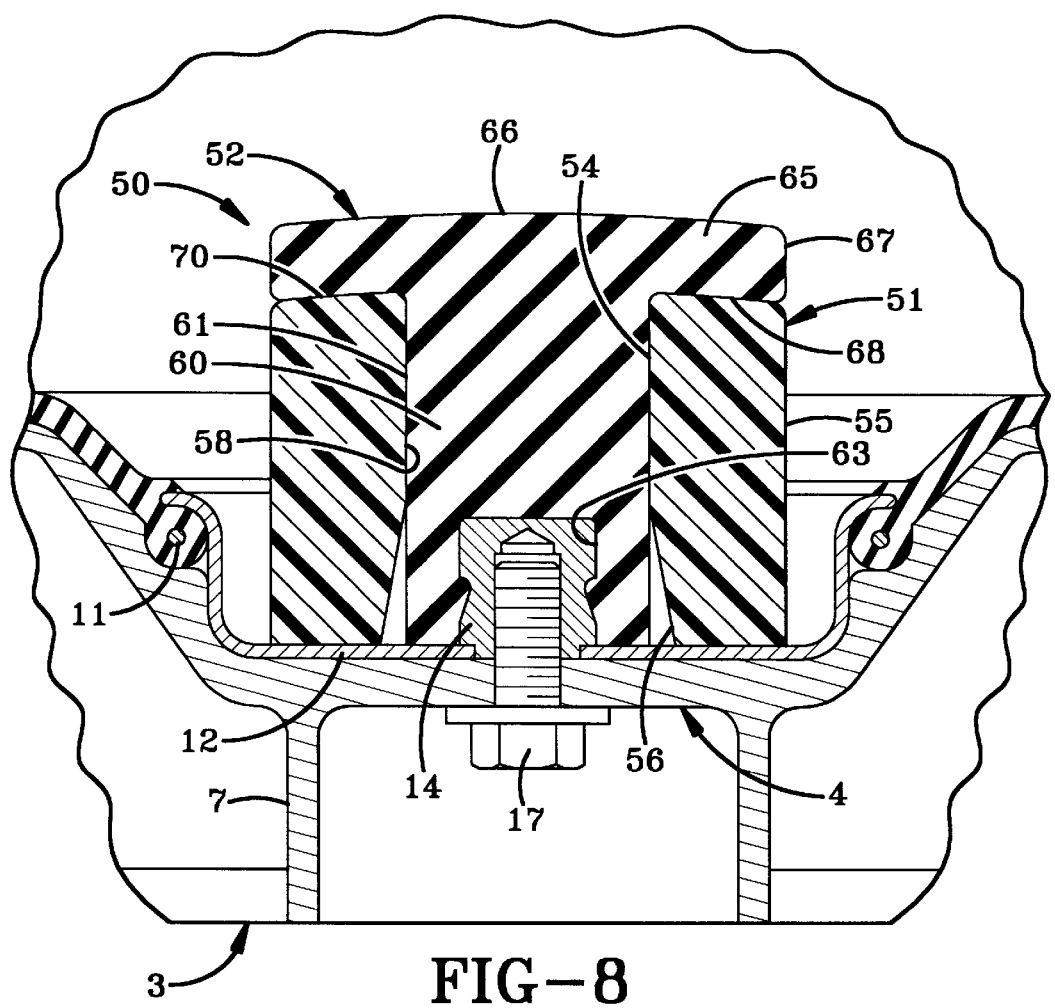
FIG-8

SNAP-ON BUMPER FOR AIR SPRING

BACKGROUND OF THE INVENTION

1. Technical Field

The invention relates to air springs and in particular to air springs having an internal bumper which acts as a backup in case of air spring failure or to absorb sudden large deflections or shocks imparted on the air spring. More particularly, the invention relates to an air spring having a two-piece snap-on bumper having a rigid base and an elastomeric top replacing the heretofore used single piece elastomeric bumper.

2. Background Information

Pneumatic springs, commonly referred to as air springs, have been used for motor vehicles and various machines and other equipment for a number of years to provide cushioning between movable parts, primarily to absorb shock loads imparted thereon. The air spring usually consists of a flexible rubber sleeve which extends between a pair of end members and which contains a supply of compressed air. One of the end members usually is a piston located at the end of the flexible sleeve. The end members mount the air spring on spaced components or parts of the vehicle or equipment on which the air spring is mounted.

The internal pressurized fluid which is generally air, absorbs most of the shock impressed upon or experienced by one of the spaced end members on which the air spring is mounted, with the end members moving axially towards and away from each other upon absorbing the imparted shock. Examples of such air springs are shown in U.S. Pat. Nos. 4,852,861 and 4,946,144.

Certain of these prior art air springs have internal bumpers mounted on one of the end members which extends into the interior of the pressurized chamber. The bumper prevents total collapse or deflection of the spring member in the event of air spring failure or when not inflated, or to absorb shock upon the spring experiencing severe shocks and deflections. Heretofore, these bumpers consisted of a single elastomeric member which was mounted on a stud extending outwardly from one of the end members such as shown in U.S. Pat. Nos. 4,506,910 and 4,787,606. Although these single member elastomeric bumpers are satisfactory for most applications, it is desirable for certain applications that the bumper has a higher load carrying capacity with less deflection than that provided by the integral one-piece bumpers such as shown in the above referenced U.S. Patents.

Examples of other prior art showing shock absorbing components are set forth in the following patents.

U.S. Pat. No. 4,478,396 discloses an elastomeric bumper which is mounted on the top of a vehicle strut.

U.S. Pat. No. 3,658,314 discloses a fluid shock absorber having an elastomeric member mounted between two concentrically movable tubes with an elastomeric bumper mounted beneath the inner tube to absorb impact from the tube.

U.S. Pat. No. 4,342,264 shows another type of air spring using an elastomeric bumper mounted on one of the end members.

U.S. Pat. No. 4,218,599 discloses a polymer spring for use in a drawer of a cabinet to ensure that when the drawer is closed it does not rebound to a partially opened position.

U.S. Pat. No. 5,201,500 shows an air spring bumper consisting of one or more plastic members mounted in a stacked array on a mounting post within the pressure chamber.

However, the need exists for an improved type of air spring bumper which eliminates the heretofore used integral one-piece elastomeric bumper and replaces the same with a two component snap-on bumper which has a higher load carrying capacity with less deflection than those prior one-piece elastomeric bumpers.

SUMMARY OF THE INVENTION

An objective of the invention includes providing an improved air spring construction for motor vehicles and other types of equipment having spaced movable end members and a two-piece snap-on bumper mounted within a pressurized chamber formed within an elastomeric sleeve which extends between the end members, for absorbing excessive shock imparted on the end members, and which has a greater load carrying capacity with lower deflection than the heretofore known bumper constructions.

A further objective of the invention is to provide such an improved air spring in which the shock absorbing bumper is comprised of a rigid base member preferably formed of metal or a rigid plastic, and an elastomeric member mounted on the rigid base and extending beyond the base for contact with the opposite end member to absorb sudden large deflections and to act as a backup device in case of air spring failure.

Still another objective of the invention is to provide such an improved air spring in which the elastomeric member is snap-fitted into position on a stud which is attached to one of the end members and presses downwardly on the rigid base to maintain the elastomeric member and rigid base in assembled position on the one end member, and which can absorb greater loads and forces than the heretofore used one-piece elastomeric bumpers.

These objectives and advantages are obtained by the improved air spring construction of the invention, the general nature of which may be stated as including a pair of spaced end members adapted to be mounted at spaced locations on a structure and a flexible sleeve formed of an elastomeric material sealingly engaged with the end members and forming a pressurized fluid chamber therebetween, said improvement including a post mounted on one of the end members and extending into the fluid chamber, said post having an enlarged end portion and an undercut formed beneath said end portion and a shock absorbing bumper mounted on the post for possible impact engagement with the other of said end members, said bumper including a rigid base member having first and second ends and an axial opening formed in said member and extending between said ends, the first end being seated upon said one end member with said post extending into said opening; an elastomeric member mounted within the axial opening of the rigid base member and having mounting means engageable with the post for mounting said elastomeric member on said post, said elastomeric member having an outer end engaged with the second end of the rigid base member to secure said rigid base member on said one end member and for contacting the other of said end members for absorbing large deflections on the air spring.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

FIG. 6 is a top plan view of the metal component of the two-piece snap on bumper of FIG. 3;

FIG. 7 is a sectional view taken on line 7—7, FIG. 6; and

FIG. 8 is an enlarged fragmentary sectional view similar to FIG. 3, showing a modified two-piece snap on bumper.

Similar numerals refer to similar parts throughout the drawings.

DESCRIPTION OF THE PREFERRED EMBODIMENTS

Figure 1:
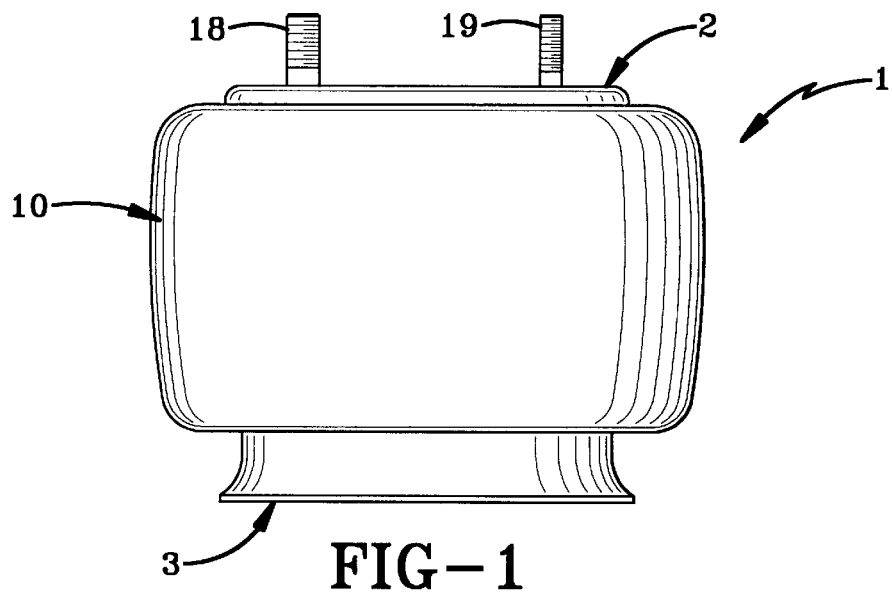
FIG. 1 is a side elevational view of an air spring having the improved two-piece snap on bumper incorporated therein.
Figure 2:
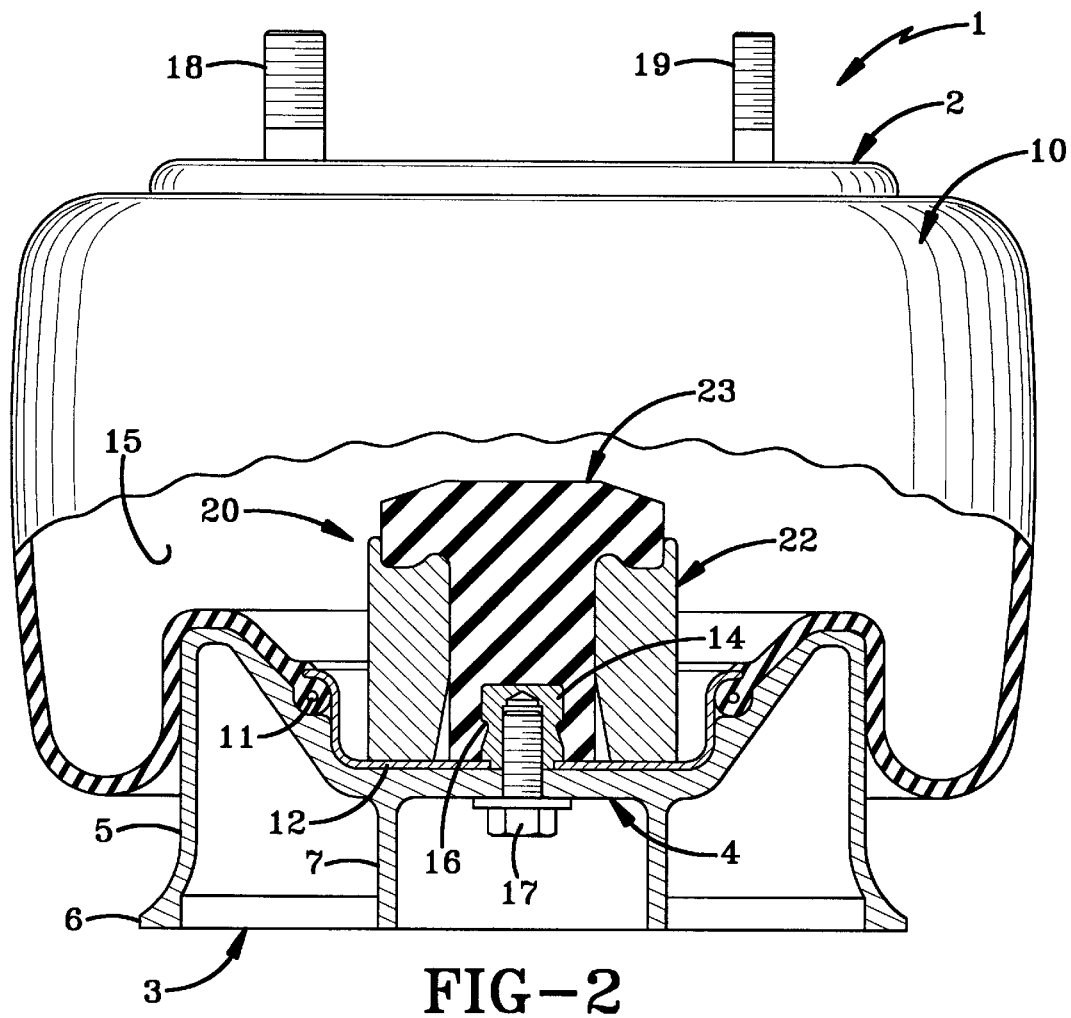
FIG. 2 is an enlarged elevational view of FIG. 1, with portions broken away and in section.

The improved air spring of the invention is indicated generally at 1, and is shown in an unmounted, at-rest position in FIG. 1. Air spring 1 includes an upper end cap and an opposed axially spaced piston member, indicated generally at 2 and 3, respectively (FIG. 2). Piston 3 is of a usual construction, preferably having an inverted generally bowl-shaped configuration formed of a suitable material such as aluminum, steel, high strength plastic or the like. Piston 3 includes a base 4 and an annular wall 5 extending downwardly from the base, terminating in a peripheral edge 6. A central supporting structure 7 is joined with and extends downwardly from base 4.

One end of a flexible sleeve which is indicated generally at 10, terminates in a lower bead 11 which is clamped on base 4 of piston 3 by a clamping plate 12 in an air tight sealing relationship with piston 3. The other end of sleeve 10 has an end bead (not shown) which is secured in a curled marginal edge of mounting end cap 2 in an air tight sealing relationship therewith, providing a fluid tight chamber 15 within elastomeric sleeve 10. Other types of end sealing arrangements may be utilized without affecting the concept of the invention, such as shown in U.S. Pat. Nos. 4,852,861, 4,787,606 and 4,946,144.

A source of pressurized air or other fluid, communicates with chamber 15 through an air inlet in a mounting stud 18 extending outwardly from end plate 2. One or more additional mounting studs 19 are mounted on end cap 2 and extend upwardly therefrom for mounting air spring 1 on a vehicle, machine tool or other application in which it is to be used.

A usual bumper mounting stud or post 14 is brazed or welded on plate 12 and extends upwardly into pressure chamber 15. Post 14 preferably has a bulbous head formed with an undercut 16. A fastener 17 attaches piston 3 to plate 12.

Figure 3:
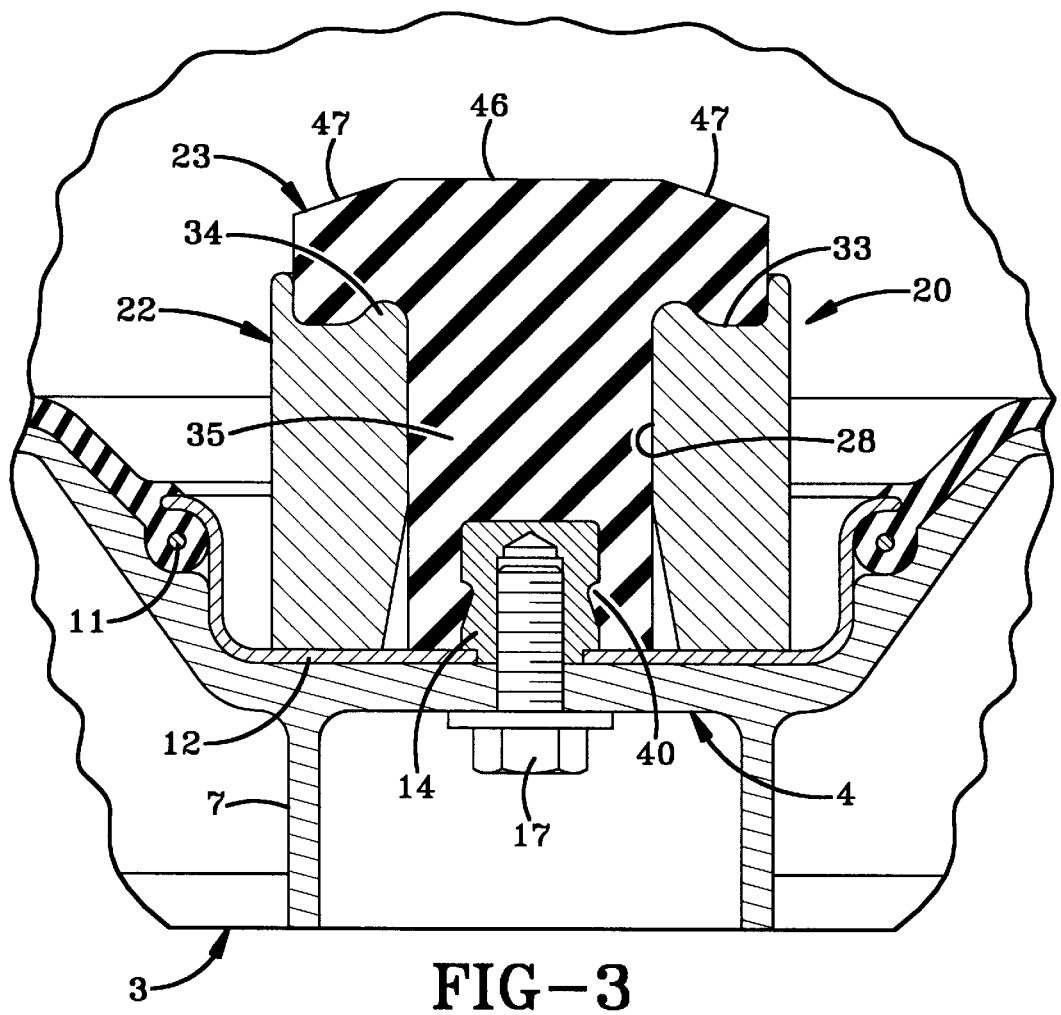
FIG. 3 is a further enlarged fragmentary sectional view of the two-piece snap on bumper of FIG. 2 shown in section.

The particular air spring construction described above and shown in the drawings and particularly in FIGS. 1, 2 and 3, is of a usual known construction and may vary without affecting the concept of the invention.

In accordance with the invention, an improved two-piece snap-on bumper indicated generally at 20, is mounted on base 4 of piston 3 and extends upwardly therefrom into chamber 15. Bumper 20 is adapted to engage end cap 2 in the event of a failure of the pressurized fluid within air chamber 15, or assists in absorbing excessive shock forces exerted on either of the end members. Bumper 20 includes a rigid base member indicated generally at 22, and an elastomeric member indicated generally at 23. Rigid base 22 is shown particularly in FIGS. 6 and 7, and preferably is a substantially cylindrical member formed of a lightweight metal such as aluminum, although it could be formed of a rigid plastic. Base 22 has concentric outer and inner cylindrical walls 24 and 25. Wall 25 may terminate in a bottom conical wall 26 which together with wall 25, form an axially extending opening or bore 28. Base 22 terminates in a flat annular bottom end 30 and a top end indicated generally at 31. Top end 31 includes an annular groove or recess 33 extending concentrically about axial opening 28.

Figure 4:
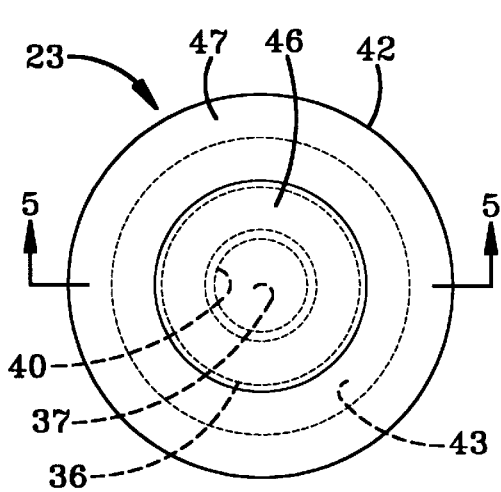
FIG. 4 is a top plan view of the elastomeric component of two-piece snap on bumper of FIG. 3.
Figure 5:
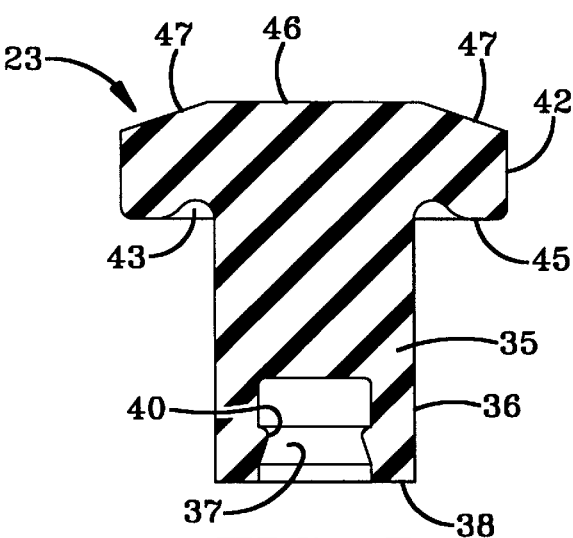
FIG. 5 is a sectional view taken on line 5—5, FIG. 4.

Elastomeric member 23 shown particularly in FIGS. 4 and 5, and includes a substantially cylindrical body 35 defined by an outer cylindrical wall 36. A cavity indicated generally at 37, extends inwardly from a flat bottom surface 38 in the lower end of body 35. Cavity 37 is formed with at least an inwardly extending annular projection or rib 40 which is complementary in shape and size to post 14 enabling member 23 to be snap-fitted on post 14 as shown in FIG. 3.

The outer or free end of member 23 is formed with a flanged or bulbous configuration and has an outwardly extending annular portion 42 formed with an annular undercut 43 adjacent body 35. Undercut 43 forms an annular rib-like member 45 which is seated in annular recess 33 of rigid base 22 as shown in FIG. 3, with an annular rib 34 of base 22 extending into complementary-shaped annular recess 43 of elastomeric member 23. The top surface of member 23 may have a flat section 46 and a downwardly tapered annular outer end portion 47 which engages upper end plate 2 in the event of air spring failure or an exceptionally large deflection being experienced by air spring 1.

Referring to FIGS. 2 and 3, it is readily understood that elastomeric member 23 and in particular cylindrical body 35 thereof, is telescopically slidably mounted within axial opening 28 of rigid base 22 and is snap-fitted onto post 14 in a similar manner as are single piece elastomeric bumpers such as shown in U.S. Pat. No. 4,787,606. However, the combination of elastomeric member 23 and rigid base 22 provides a bumper which has a very high load carrying capacity with low deflection, since should upper end cap 2 come in contact with bumper 20, only the upper portion of the elastomeric member is compressed against rigid base 22 with much of the shock being absorbed by rigid base 22. If desired, elastomeric member 23 could be bonded to rigid base 22 either within axial opening 28 or at the upper end thereof, or could be unattached with base 22 being rigidly clamped against piston plate 12 by the downward pressure exerted thereon by elastomeric member 23 as it is snap-fitted onto post 14.

A modified embodiment of the two-piece snap-on bumper of the present invention is shown in FIG. 8, and is indicated generally at 50. Bumper 50 is similar to bumper 20 in that it includes a rigid base member 51 and an elastomeric member 52. Base 51 is substantially annular with inner cylindrical surface 54 and outer cylindrical surface 55, and may also have a conical lower end section 56 which together with surface 54 form an axial opening 58, and is formed of a rigid plastic material.

Elastomeric member 52 has a cylindrical body 60 with a cylindrical outer wall 61 and a cavity 63 formed in a bottom end thereof which is complementary in shape and size to the configuration of post 14 in order to form a snap-fit engagement therewith. An upper end 65 of elastomeric member 52 is formed with a generally smooth outer surface 66 and an outwardly extending annular flanged end 67 having a smooth annular bottom surface 68 which is pressed against a complementary shaped smooth annular outer surface 70 of base 51.

Again, the snap-fit engagement of elastomeric member 52 with post 14 may clamp rigid base 51 against plate 12 or base 51 could be bonded to elastomeric member 52 by an adhesive or during a molding operation or similar fabrication means well known in the art.

Again, bumper 50 provides a two-piece bumper which is snap-fitted on a usual mounting post present in many air spring constructions in order to increase the load carrying capacity than that provided by an integral one piece elastomeric bumper, with low deflection, by the mounting of the elastomeric member on a rigid base. It is also readily seen to anyone skilled in the art that elastomeric members 23 and 52 could be mounted in another manner on rigid bases 22 and 51 than the particular arrangements shown in FIGS. 3 and 8 without affecting the concept of the invention.

Accordingly, the improved two-piece snap-on bumper for air springs is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purpose and are intended to be broadly construed.

Moreover, the description and illustration of the invention is by way of example, and the scope of the invention is not limited to the exact details shown or described.

Having now described the features, discoveries and principles of the invention, the manner in which the improved two-piece snap-on bumper is constructed and used, the characteristics of the construction, and the advantageous, new and useful results obtained, the new and useful structures, devices, elements, arrangements, parts and combinations, are set forth in the appended claims.

What is claimed is:

1. An improved air spring having spaced first and second end members adapted to be mounted at spaced locations on a structure and a flexible sleeve formed of an elastomeric material sealingly engaged with the end members and forming a pressurized fluid chamber therebetween, said improvement including a post mounted on the first end member and extending into the fluid chamber, said post having an enlarged end portion and an undercut formed beneath said enlarged end portion and a shock absorbing bumper mounted on the post for possible impact engagement with the second end member, said bumper including:

a rigid base member having first and second ends and an axial opening formed in said rigid base member and extending between said first and second ends, the first end being seated upon said first member with said post extending into said axial opening;

an elastomeric member mounted within the axial opening of the rigid base member and engageable with the post for mounting said elastomeric member on said post, said elastomeric member having an outer end which seats upon the second end of the rigid base member in a spaced relationship from the second end member to secure said rigid base member on said first end member and for contacting the second end member when large deflections are experienced by the air spring.

2. The improved air spring defined in claim 1 in which the rigid base member has a generally cylindrical configuration with concentrically spaced inner and outer walls, with said inner wall defining the axial opening; and in which said axial opening terminates in a conical section adjacent the first end.

3. The improved air spring defined in claim 1 in which a groove is formed in the second end of the rigid base member; in which the elastomeric member includes a main body which is mounted within the axial opening of the rigid base member; and in which the outer end of said elastomeric member includes portions which are seated in said groove.

4. The improved air spring defined in claim 3 in which the groove is substantially annular; and in which the outer end portions of the elastomeric member includes a substantially annular projection which seats in said groove.

5. The improved air spring defined in claim 1 in which the second end of the rigid base member is substantially smooth; in which the elastomeric member includes a main body which is mounted within the axial opening of the rigid base member; and in which the outer end of said elastomeric member includes an outwardly extending portion which seats upon the second end of said rigid base member.

6. The improved air spring defined in claim 5 in which the outwardly extending portion of the elastomeric member is bonded to the second end of the rigid base member.

7. The improved air spring defined in claim 1 in which the rigid base member is formed of metal.

8. The improved air spring defined in claim 7 in which the rigid base member is formed of aluminum.

9. The improved air spring defined in claim 1 in which the rigid base member is formed of plastic.

10. The improved air spring defined in claim 1 in which the elastomeric member has a main body which is mounted within the axial opening of the rigid base member; in which the elastomeric member includes a bottom end located opposite of the outer end; in which the bottom end is formed with a cavity extending partially into said main body; and in which a projection is formed on the main body and extends into said cavity which engages a complementary projection formed on the post to provide a snap-fit connection therebetween.

11. The improved air spring defined in claim 10 in which the post projection is formed by an annular undercut; and in which the projection formed on the main body of the elastomeric member is an annular rib extending generally radially into the cavity.

12. The improved air spring defined in claim 1 including a fastener for mounting said first end member, a clamp plate and the flexible sleeve in an assembled condition.

13. The improved air spring defined in claim 12 in which said first end member is a piston and the other of said end members is an end cap.

14. An air spring having a pair of spaced end members adapted to be mounted at spaced locations on a structure; a flexible sleeve formed of an elastomeric material sealingly engaged with the end members and forming a pressurized fluid chamber therebetween; a post mounted on one of the end members and extending into the fluid chamber; a shock absorbing bumper mounted on the post for engagement with the other of said end members, said bumper including a rigid base member having first and second ends and an axial opening extending through said base member, the first end being seated upon said one end member; and an elastomeric member having a main body extending through the axial opening of the rigid base and having a snap-fit engagement with the post for mounting said elastomeric member on said post, said elastomeric member having an outer end engaged with the second end of the rigid base member biasing said rigid base against the said one end member to secure said rigid base member on said one end member and for contacting the other of said end members only when large deflections are experienced by the air spring.

15. The air spring defined in claim 14 in which the elastomeric member has a bottom end which is located opposite of said outer end; in which a cavity is formed in said bottom end and extends partially into the main body; and in which a projection is formed within said cavity and engages a complementary projection formed on the post to provide the snap-fit connection between the post and the elastomeric member.

16. The air spring defined in claim 14 in which the rigid member is formed of metal.

17. The air spring defined in claim 14 in which the rigid member is formed of plastic.

* * * * *